US009762962B2

(12) United States Patent
Canney (10) Patent No.: US 9,762,962 B2
(45) Date of Patent: Sep. 12, 2017

(54) SYSTEMS AND METHODS FOR COUNTERING INFORMATION BLOCKING ON A DEVICE

(71) Applicant: Canoe Ventures, LLC, Englewood, CO (US)

(72) Inventor: Jason Canney, Highlands Ranch, CO (US)

(73) Assignee: Canoe Ventures, LLC, Englewood, CO (US)

( * ) Notice: Subject to any disclaimer, the term of this patent is extended or adjusted under 35 U.S.C. 154(b) by 0 days.

(21) Appl. No.: 15/237,013

(22) Filed: Aug. 15, 2016

(65) Prior Publication Data

US 2017/0134805 A1   May 11, 2017

Related U.S. Application Data

(60) Provisional application No. 62/253,600, filed on Nov. 10, 2015.

(51) Int. Cl.

| | |
|---|---|
| *H04N 7/16* | (2011.01) |
| *H04N 21/454* | (2011.01) |
| *H04N 21/472* | (2011.01) |
| *H04L 29/06* | (2006.01) |
| *H04N 21/41* | (2011.01) |
| *H04L 29/08* | (2006.01) |

(52) U.S. Cl.
CPC ....... *H04N 21/454* (2013.01); *H04L 65/4084* (2013.01); *H04N 21/4126* (2013.01); *H04N 21/47202* (2013.01); *H04L 67/02* (2013.01)

(58) Field of Classification Search
CPC ........... H04N 21/454; H04N 21/47202; H04N 21/4126; H04L 65/4084; H04L 67/02
See application file for complete search history.

(56) References Cited

U.S. PATENT DOCUMENTS

| | | | |
|---|---|---|---|
| 6,605,120 B1 * | 8/2003 | Fields | G06F 17/30867 707/E17.109 |
| 2006/0123448 A1 * | 6/2006 | Ma | H04N 21/41407 725/51 |
| 2007/0150342 A1 * | 6/2007 | Law | G06Q 30/02 705/14.52 |
| 2010/0268596 A1 * | 10/2010 | Wissner | G06F 17/30864 705/14.49 |

(Continued)

*Primary Examiner* — Oschta Montoya
(74) *Attorney, Agent, or Firm* — Duft Bornsen & Fettig LLP; Gregory T. Fettig (57) ABSTRACT

Systems and methods presented herein provide for countering functionality on a UE that prevents the UE from requesting asset insertion into COD content. An ADS evaluates and ranks a plurality of assets for insertion into the selected COD content. A request manager determines that the UE is blocking a request for asset insertion into COD content selected by the UE, and generates a message for the UE requesting payload delivery information for the selected COD content based on the determination. The message circumvents the blocking and directs the UE to request asset insertion. The request manager processes a response from the UE for the payload delivery information, extracts a request for asset insertion from the response, directs the ADS to select a first of the assets based on the ranking, and directs the remote COD provider to insert the first asset with the selected COD content.

9 Claims, 7 Drawing Sheets

(56) References Cited

U.S. PATENT DOCUMENTS

2010/0268702 A1* 10/2010 Wissner ............ G06F 17/30705
707/711
2013/0246323 A1* 9/2013 Athas ....................... G06N 5/02
706/46
2013/0311670 A1* 11/2013 Tarbox ............... H04N 21/2387
709/231

* cited by examiner

SYSTEMS AND METHODS FOR COUNTERING INFORMATION BLOCKING ON A DEVICE

CROSS REFERENCE TO RELATED APPLICATIONS

This patent application claims priority to, and thus the benefit of an earlier filing date from, U.S. Provisional Patent Application 62/253,600 (filed Nov. 10, 2015), the entire contents of which are hereby incorporated by reference.

FIELD OF THE INVENTION

The invention relates to the field of Content On Demand (COD) delivery to devices.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content", have designated timeslots in which the sponsors' advertisements, or "assets", are inserted. The content and the inserted assets are then broadcast by the television networks, or "content owners", to the public over federally licensed communication airways, occasionally referred to as linear video distribution.

This "shotgun" approach to advertising proved to be very successful in the beginning. However, as the number of advertisers wishing to sell their goods and services increased, television evolved into a much more complex system of communications. Today, cable television providers and satellite television providers (e.g., "content providers") serve as intermediary content providers between the content owners and the intended public audience. And, the number of content owners has dramatically increased. In this regard, many members of the general public have signed on as customers of the cable/satellite content providers so as to receive a broader availability of content.

Because the market for content consumption has grown, the number of content providers has also grown. And, because each of these providers has its own method of content delivery, the manner in which the content and assets are delivered to the customers has become increasingly complex. Generally, the content owners deliver the content to the content providers with instructions to insert various national assets into the content at certain times. For example, if a company wishes to run a national advertisement campaign targeting a certain television show associated with a particular demographic, the company may purchase one or more timeslots, or "placement opportunities", within that television show from the content owner to air assets advertising the goods and services of the company. The content owner then provides the content to each of the content providers with directions to insert the assets within the timeslots purchased by the company.

The content providers may also have certain timeslots available for inserting certain local assets. For example, a content provider may have "headends" configured in various communities to distribute content to their customers located therein. Each headend receives content from the content providers with various designated timeslots for inserting assets into the content. Some of those timeslots may be designated for local advertisements where companies within the service area of the headend wish to advertise. These companies purchase those timeslots from the content provider for insertion of their assets to expose the customers to their advertising at the more local level.

As complex as the cable/satellite television has become, certain devices have come along to change and/or circumvent these forms of marketing altogether. The digital recorder, such as that produced by Tivo, is one example of a means for avoiding the asset insertions of marketing strategists. With the digital recorder, the content providers' customers are able to digitally record entire episodes of content and view that content at their leisure, as opposed to a time established by the content providers. However, these customers can also use the digital recorders to fast-forward or skip through the assets without viewing them, much to the dismay of the asset owners.

In response, content providers started providing content on a "Content On Demand" (COD) basis, sometimes referred to as nonlinear video distribution. In COD, the content provider delivers the content to the content provider which in turn maintains the content for subsequent and individual distribution to their customers. Thus, a customer may select a desired content through a streaming media player, a smart phone, computer, or the like (collectively referred to herein as "user equipment" or "UE") and watch that content at the customer's leisure. For example, a user wishing to access content on a smart phone through the internet may contact a website through a web browser to view that content on the user's smart phone. The website may then deliver the content to the user's web browser operating on the user's smart phone.

When the content provider delivers the content to the UE, monetization of the content is sought. For example, advertisers wishing to sell their goods and services may pay the content provider to deliver their advertisements with the content to the UE. And, the content provider, desiring to increase the revenue of the advertising may use an asset decision system (ADS) to determine which advertisements are most valuable in the content being delivered to the user's device.

Generally, when the content is delivered to the UE, the html or java programming of the UE is operable to generate and transmit a request message to the ADS asking which advertisements are to be provided with the content. However, software developers have devised ways to block the request messages and thereby prevent the ADS from delivering advertisements to the user's device.

SUMMARY

Systems and methods presented herein provide for countering functionality on a UE that prevents the UE from requesting asset insertion into COD content. In one embodiment, a system comprises an asset decision system (ADS) operable to interact with a remote COD provider that provides a selected COD content to a user's equipment (UE), to evaluate a plurality of assets for insertion into the selected COD content, and to rank the assets. The system also includes a request manager operable to determine that the UE is blocking a request for asset insertion into the selected COD content, and to generate a message for the UE requesting payload delivery information for the selected COD content based on the determination. The message further includes information that circumvents the blocking and directs the UE to request asset insertion. The request manager is further operable to process a response from the UE for the payload delivery information for the selected COD content, to extract a request for asset insertion from the response, to direct the ADS to select a first of the assets based on the ranking, and to direct the remote COD provider to insert the first asset with the selected COD content.

The various embodiments disclosed herein may be implemented in a variety of ways as a matter of design choice. For example, the embodiments may take the form of physical machines, computer hardware, software, firmware, or combinations thereof. In one embodiment, a computer readable medium is operable to store software instructions for directing the asset insertion into content. These software instructions are configured so as to direct a processor or some other processing system to operate in the manner described above. Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1A:
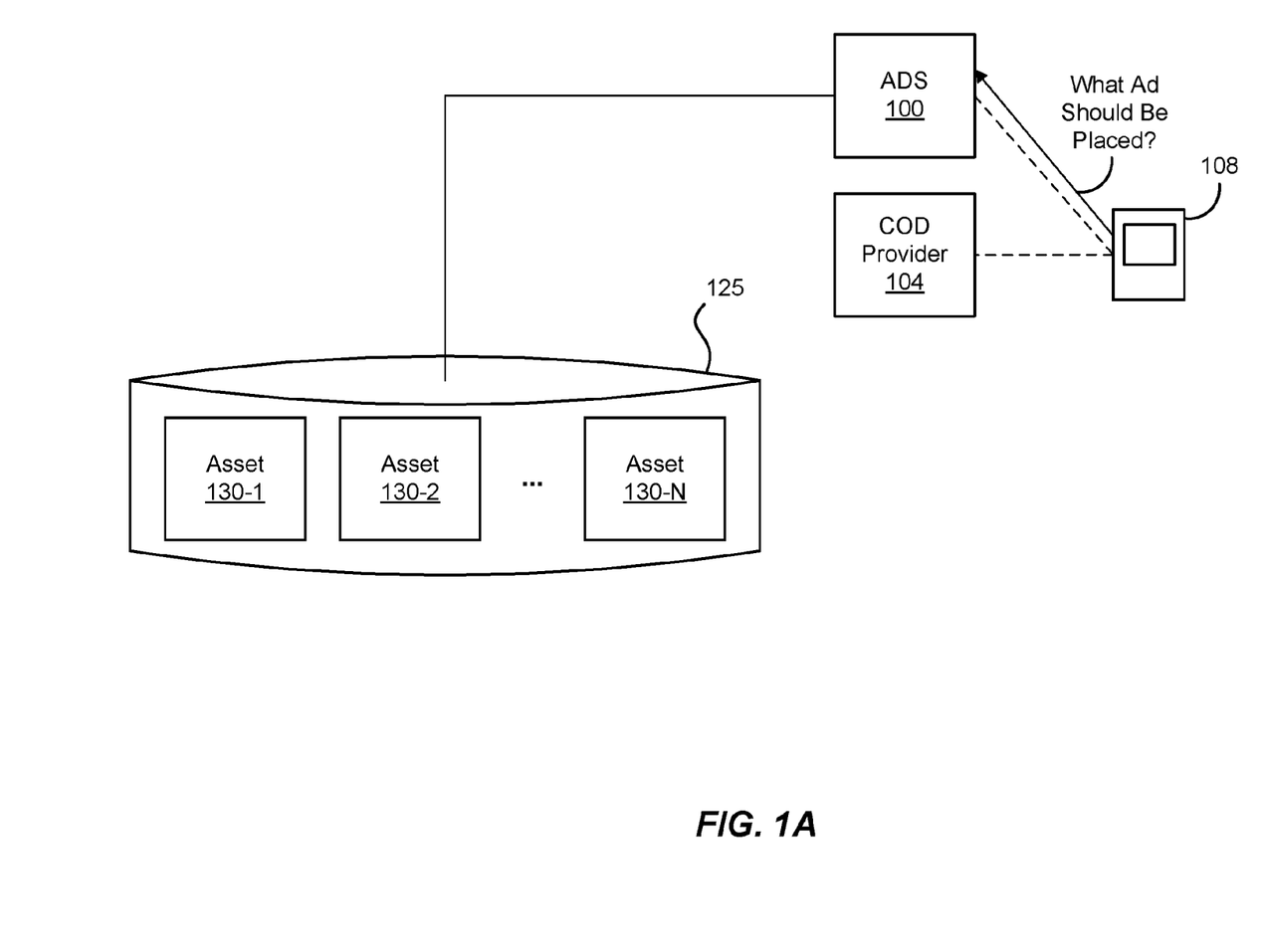
FIGS. 1A and 1B are block diagrams of an ADS and a COD provider delivering content to a device in one exemplary embodiment.
Figure 1B:
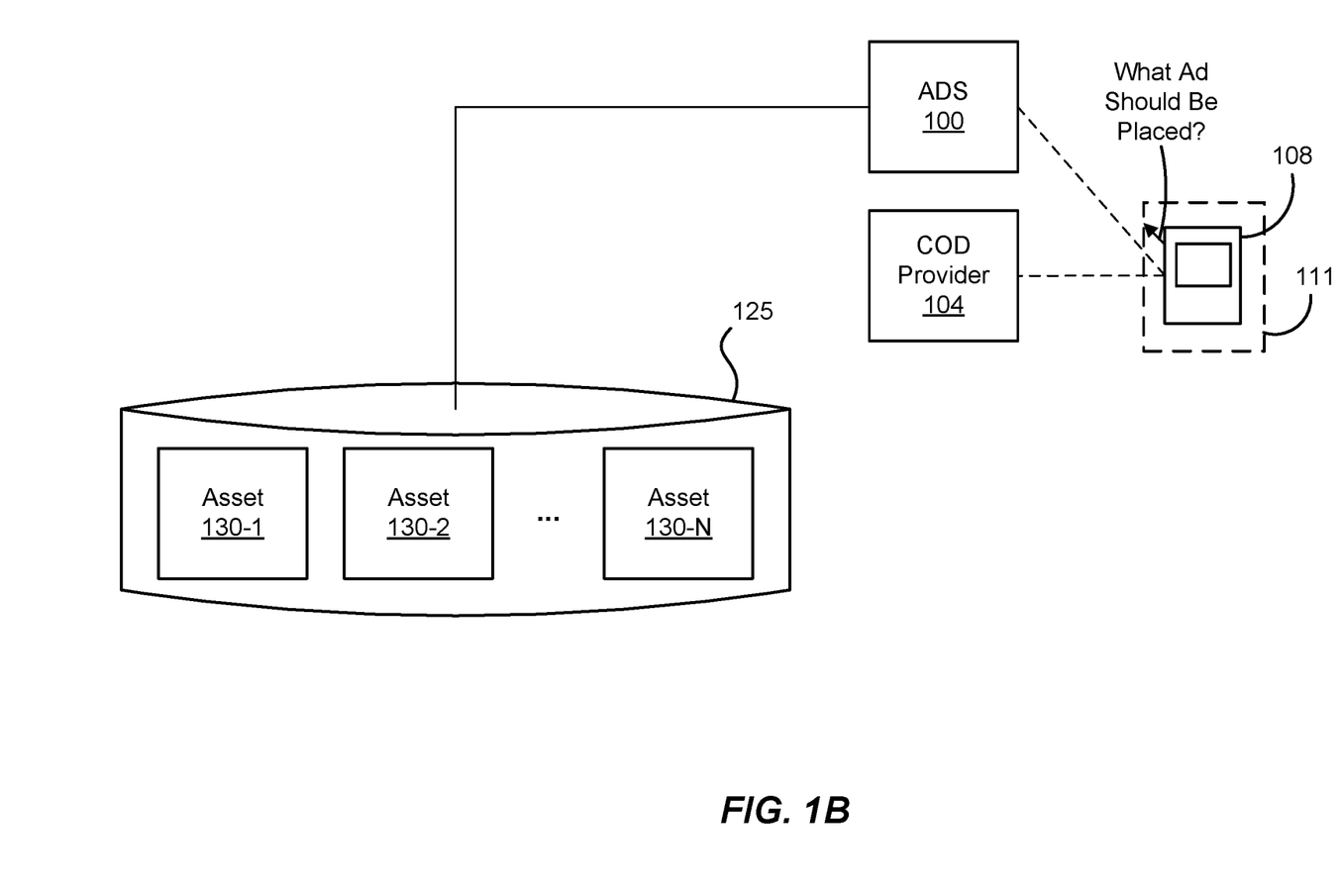

FIGS. 1A and 1B are block diagrams of a COD provider 104 and an ADS 100 delivering content to a device in one exemplary embodiment. More specifically, in FIG. 1A, the COD provider 104 delivers content selected by a UE 108 (e.g., a cell phone, tablet computer, a laptop computer, a set-top box, or the like—collectively referred to herein as UE). When the COD provider 104 delivers the content to the UE 108, for example over the Internet, the UE 108 triggers a request to the ADS for advertisements that need to be placed in or alongside the content being delivered. These advertisements are generally represented by the assets 130-1-130-N residing in a national database of assets 125 (wherein the reference number "N" is merely represents an integer greater than 1 and not necessarily equal to any other "N" reference designated herein).

To block advertisements from being delivered to the UE 108, software developers have devised software and/or other functionality that prevent the UE 108 from transmitting the request for assets. An example of such is illustrated in FIG. 1B. For example, FIG. 1B illustrates software 111 being implemented on the UE 108 to block the request for assets to the ADS 100. And, since the ADS 100 does not receive a request for assets, no assets can be delivered to the UE 108

Figure 2:
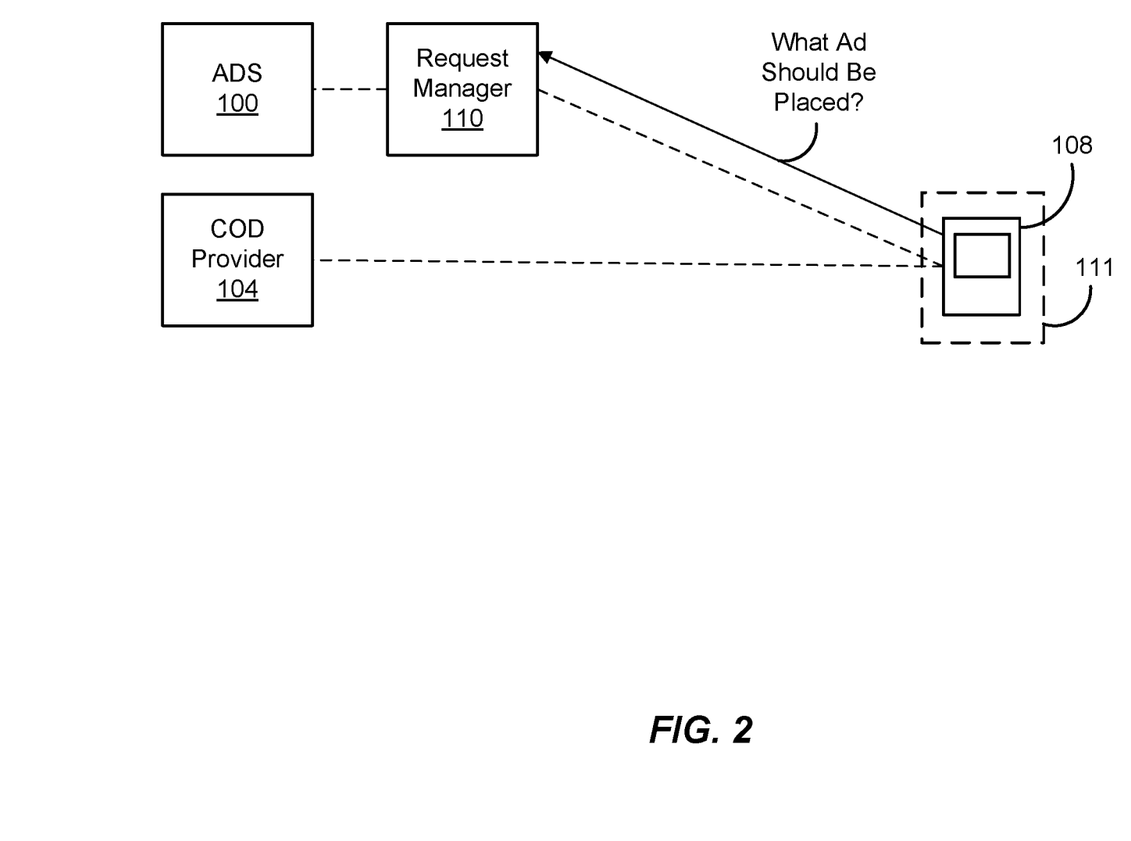
FIG. 2 is a block diagram of the COD provider and the ADS delivering content to a device along with a request manager in another exemplary embodiment.

In FIG. 2, a request manager 110 is implemented to circumvent the software 111 preventing the request message from being transmitted by the user device 108. Generally, the request manager 110, when making contact with the UE 108, transmits a message when the content is being provided by the COD provider 104. The request manager 110 then elicits a response from the UE 108 so that the UE 108 can ask which ads should be placed in or alongside that content being delivered.

In one embodiment, when the request manager 110 determines that it is not receiving requests for assets from the UE 108, the request manager 110 further determines that there must be some blocking software 111 that prevents the request from the UE 108. The request manager 110 then modifies its messaging to the UE 108 to "trick" the software 111 into thinking that the UE 108 is responding to a different message when it is in actuality responding to a request for assets to be placed in the content being delivered. For example, the request manager 110 may generate a message for a video service provider with an alternate payload to utilize when the request manager 110 determines the UE 108 is being blocked. So, the UE 108 thinks it is responding to another type of request as opposed to a request for assets. And, the request manager 110 may also randomly change the messaging such that the software 111 making it more difficult for the software 111 to figure out the type of messaging the UE 108 is responding to.

Examples of the messages are shown and described below:

(1) HTTP Ad Request from the UE 108 via the Internet protocol to the request manager 110 when the UE 108 is not being blocked by the software 111 http://pubads.g.doubleclick.net/gampad/ads?ac-ctn=1049652-589456789&output=vast3.0&reg=arope9020303klet&sid=TnFP1NIVIKIbWfdlx2wUyo5EOYyyDbFq5T&entpid=usanetwork.com&entaid=NBCU2012081600000326&plat=IP&hhid=1e7308e6-e83b-11e1-8ec7-001a64991a68&dvid=bf809608-317a-4fbc-9675-d08f060869bc&dvtyp=stb&ct=2012-09-18T17:49:35.778&adavref=8cbfc1f8-7634-4923-a001-9a0b58930146&src=8&bi=1&bx=1&mrn=&bos=1&boe=2&sos=1&soe=8&prod=preroll&type=Ad&l=false&f=true&mind=&maxd=p1m0.000s&maxp=1

(2) HTTP Request from the UE 108 via the Internet protocol to the request manager 110 using alternate metadata qualifiers that can rotate (e.g., change) for each user session to circumvent the software 111.

http://info.denverpost.com/gampad/ABC?ac-ctn=1049652-589456789&output=ABC3.0&reg=arope9020303klet&sid=TnFP1NMKIbWfdlx2wUyo5EOYyyDbFq5T&entpid=usanetwork.com&entaid=REDTRUCK2012081600000326&plat=&*%&hhid=1e7308e6-e83b-11e1-8ec7-001a64991a68&dvid=bf809608-317a-4fbc-9675-d08f060869bc&dvtyp=stb&ct=2012-09-18T17:49:35.778&denverpost.com=8cbfc1f8-7634-4923-a001-9a0b58930146&src=8&bi=1&bx=1&mrn=&bos=1&boe=2&sos=1&soe=8&prod=preroll&type=Ad&l=false&f=true&mind=&maxd=p1m0.000s&maxp=1

Figure 3:
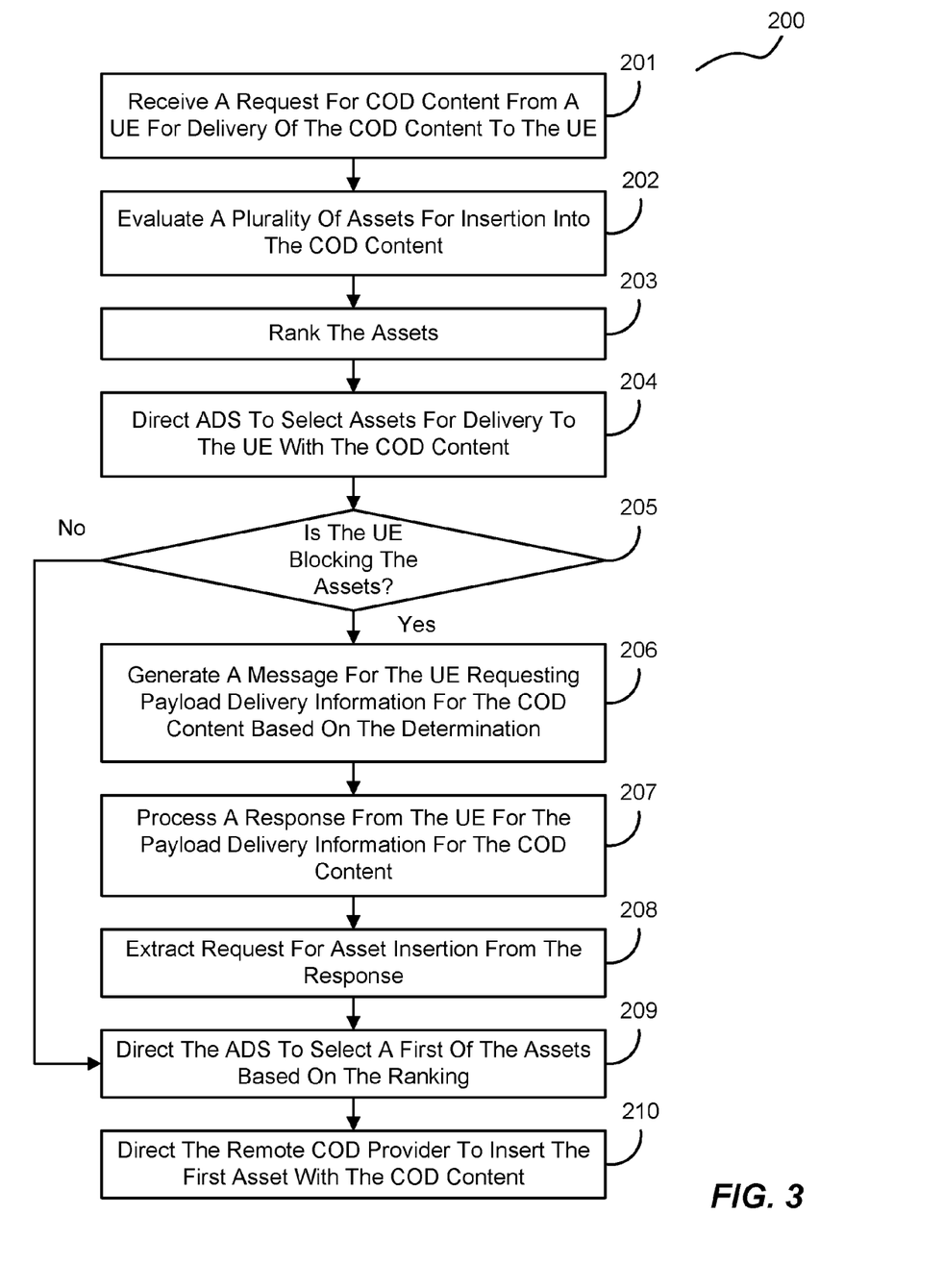
FIG. 3 is a flowchart of an exemplary process of the system of FIG. 2.

In an original session setup request, the UE 108 would receive a payload that contained a normal set of information from the site as well as the alternate values in the above payload delivery information. One example is as follows:

HTTP/1.1 200 OK
Date: Fri, 31 Dec. 1999 23:59:59 GMT
Content-Type: text/plain
Content-Length: 42
some-footer: some-value
another-footer: another-value
info.denverpost.com|ABC|ABC3.0|REDTRUCK201208-1600000326|*%|denverpost.com FIG. 3 is a flowchart of an exemplary process 200 of the system of FIG. 2. In this embodiment, the COD provider 104 receives a request for COD content from a UE 108 for delivery of the COD content to the UE 108, in the process element 201. For example, a user may wish to stream or download a television show to the user's UE 108. The television show may have timeslots available for asset insertion (e.g., commercials). The ADS 100 evaluates the plurality of assets for insertion into the television show (i.e., the selected COD content), in the process element 202, and ranks those assets, in the process element 203. Then, the request manager 110 directs the ADS 100 to select assets for delivery to the UE 108 with the COD content, in the process element 204.

After the assets are selected for delivery to the UE 108, the request manager 110 determines whether the UE 108 is blocking the assets, in the process element 205. For example, software on the UE 108 may be installed to prevent the UE 108 from requesting assets for insertion into the selected COD content. When the assets are selected, the request manager 110 waits for the UE 108 to issue a request for assets to be inserted into the COD content. When no request is received from the UE 108, the request manager 110 determines that the UE 108 is indeed blocking asset insertion.

Thus, if the UE 108 is blocking asset insertion, the request manager 110 generates a message from the UE 108 requesting payload delivery information for the selected COD content, in the process element 206. For example, the request manager 110 may generate a message that directs the UE 108 to determine how the COD content is to be delivered, including high-definition formatting, filtering (e.g., domain filtering, Cascading Style Sheets (CSS) filtering, etc.), and the like. In that message, the request manager 110 embeds a direction to the UE 108 to transfer the assets it should receive with the selected COD content.

The request manager 110 processes the response from the UE 108, in the process element 207, and extracts the request for asset insertion from the response, in the process element 208. From there, the request manager 110 directs the ADS 100 to select at least a first of the assets based on the previous ranking (e.g., the process element 203), in the process element 209. Then, being in communication with the COD provider 104, the request manager 110 directs the COD provider 104 to insert the first asset with the selected COD content, in the process element 210. In this regard, the COD provider 104 may contact the ADS 100 for the ranked assets such that the COD provider 104 can insert them into the selected COD content and deliver the combination of assets and COD content to the UE 108.

If the UE 108 is not blocking assets (i.e., the process element 205), then the request manager 110 directs the ADS 100 and the COD provider 104 to operate in accordance with the process elements 209 and 210.

It should be noted that the COD content is not intended to be limited to a television show. Other forms of COD content may be included. For example, a user of the UE 108 may wish to view a website, such as ESPN (i.e., http://espn.go.com/). The content from that website may have various asset locations where assets may be inserted as determined by the ADS 100. Similarly, the content may include music from a streaming music player, such as Spotify or Pandora. With these music players, a subscriber may choose to not pay additional fees for the streaming music, thereby causing the streaming music player to issue audio commercials between songs. These commercials, also being considered assets, may be evaluated, ranked, and selected by the ADS 100. Accordingly, the invention is not intended be limited to the form of COD content.

Figure 4:
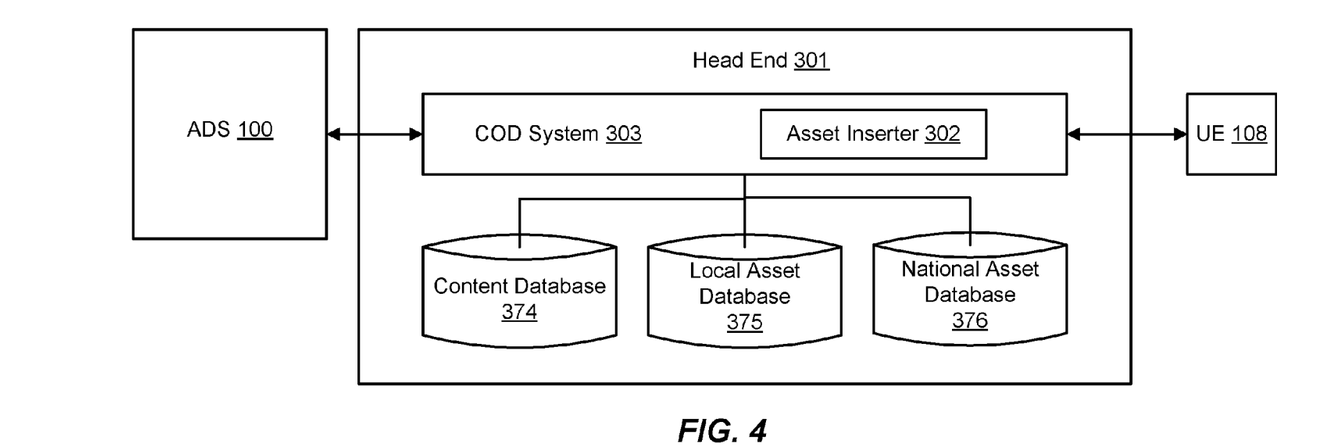
FIG. 4 is a block diagram of a headend operable with an exemplary ADS.

Exemplary embodiments of the ADS 100 and the COD provider 104 are shown and described below. For example, FIG. 4 is a block diagram of an exemplary ADS 100 operable with a COD system 303 (also known as a "COD back office system") of a headend 301 (i.e., a COD provider). The ADS 100 illustrates one example of how the ADS 100 may operate. The headend 301, in this embodiment, is generally any system operable to receive content for processing and distribution to a UE 108 (e.g., over a cable television infrastructure or from satellite). For example, the headend 301 may receive content from content providers over television signals for distribution to the customers of a cable content provider via the UE 108.

The COD system 303 of the headend 301 provides the COD content to the UE 108 when desired by the customer. For example, the headend 301 may receive the content from the content providers and maintain that content within a content database 374. The headend 301 may also maintain local assets in a local asset database 375 and national assets in a national asset database 376. When a particular COD content is selected by the user of the UE 108, an asset inserter 302 of the COD system 303 accesses the content database 374 to retrieve the selected content and deliver that content to the UE 108.

The COD system 303 is any system or device that is operable to deliver video content to the UE 108 when directed by the UE 108. The databases 374, 375, and 376 are any systems or devices operable to store and maintain data, audio, and/or video for subsequent distribution to the UE 108. For example, the databases 374, 375, and 376 may be operable within a computer system that stores the video and audio (e.g., MPEG) content and assets such that they may be accessed by the COD system 303 and delivered to the UE 108 when desired by the user of such. One or more of the databases 374, 375, and 376 may also be configured with the national database 125 described hereinabove.

The UE 108 is any device or system capable of providing content from a content provider 104 to a user. For example, a UE 108 may be a set-top box operable to communicate with a cable television headend. Alternatively, a UE 108 can be a computer capable of displaying video from a network. For example, a UE 108 may select content from an Internet website hosted with an internet server through the network. Once selected, the COD system 303 of the COD provider 104 may retrieve the content from a content database for Internet delivery (e.g., streaming video) to the selecting UE 108. Other examples of the UE 108 include gaming consoles, smart phones, electronic tablets, or the like.

Figure 5:
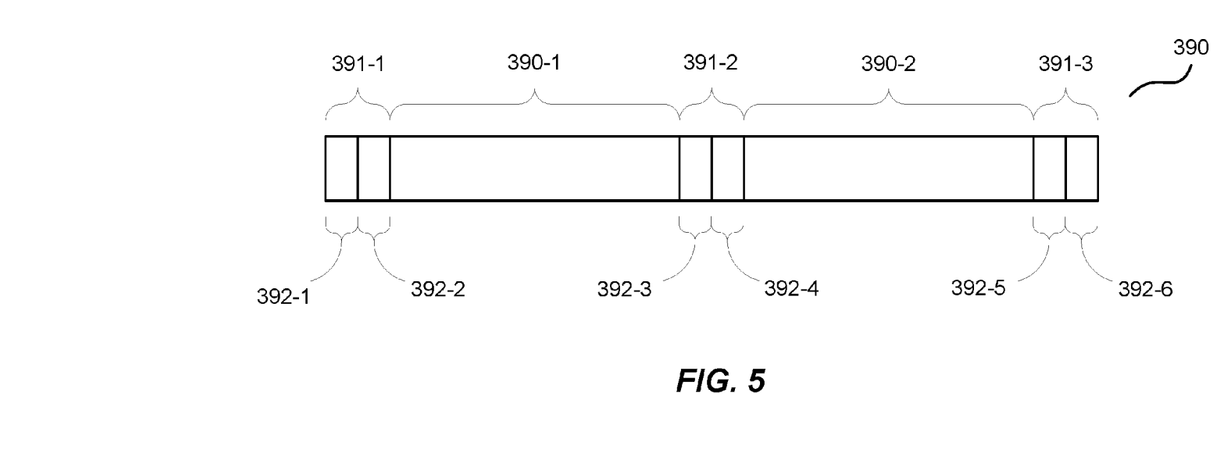
FIG. 5 is an exemplary timing diagram of a COD content selection with timeslots available for asset insertion.

To illustrate the insertion of assets into content, FIG. 5 shows an exemplary timing diagram of content 390 interlaced with asset timeslots 391, also known as "break positions". When the COD system 303 receives a message from the UE 108 for the content 390, the COD system 303 retrieves the content 390 from the content database 374. The content 390, in this embodiment, is divided into two segments 390-1 and 390-2 with timeslots 391 disposed at the front end of the content 390-1 (i.e., timeslot 391-1 at the pre roll position), in between the content segments 390-1 and 390-2 (i.e., timeslot 391-2 at the mid roll position), and at the end of the content segment 390-2 (i.e., timeslot 391-3 at the post roll position). Each timeslot 391 is divided into two asset placement timeslots 392 (i.e., asset placement opportunities), each of which is capable of accepting an asset that is typically, but not always, 30 seconds in duration. Thus, a placement opportunity is generally a subset of time of a particular timeslot 391. The ADS 100 directs the COD system 303 to insert the assets according to a particular ranking that provides value for the content provider (e.g., monetary value, enhanced relationships with asset providers, etc.). In this regard, the ADS 100 may direct the COD system 303 to select assets from the national asset database 376 and/or the local asset database 375 for insertion into the asset timeslots 392-1-392-6 based on the ranking provided by the ADS 100.

The invention is not intended be limited to any particular number of content segments 390 or any particular number of asset timeslots. In fact, an asset timeslot 392 may be subdivided for insertion of multiple assets. For example, television commercials are typically 30 seconds in length. Occasionally, however, asset providers reduce the material of certain assets to reduce the overall duration of a particular asset (e.g., by removing material from a 30 second commercial to reduce it to a 15 second commercial). Accordingly, a 30 second asset timeslot 392 may be configured to accept insertions of two 15 second assets. For example, the content 390 may be configured with the mid roll timeslot 391-2 having two 30 second asset timeslots 392-3 and 392-4. The asset timeslot 392-3 can thus be further divided into two 15 second asset timeslots 392-3-1 and 392-3-2, allowing for the insertion of two 15 second assets into the asset timeslot 392-3. Still, the invention is not intended to be limited to any particular asset duration, asset timeslot 392 duration, or timeslot 391 duration as such may be configured to meet certain business and/or technical needs.

It should be noted that the decisions regarding the direction of asset insertions occur quite rapidly. For example, the ADS 100 may be operable to make asset insertion decisions for a plurality of headends 301. And, each headend 301 may be operable to provide COD content to a plurality of CPEs 108 at any given time, possibly thousands or more. Thus, when a COD content selection is made by a particular UE 108, the ADS 100 responds in substantially real time to ensure that the COD system 303 has ample time to retrieve and insert the assets while processing the content selected by the UE 108.

Figure 6:
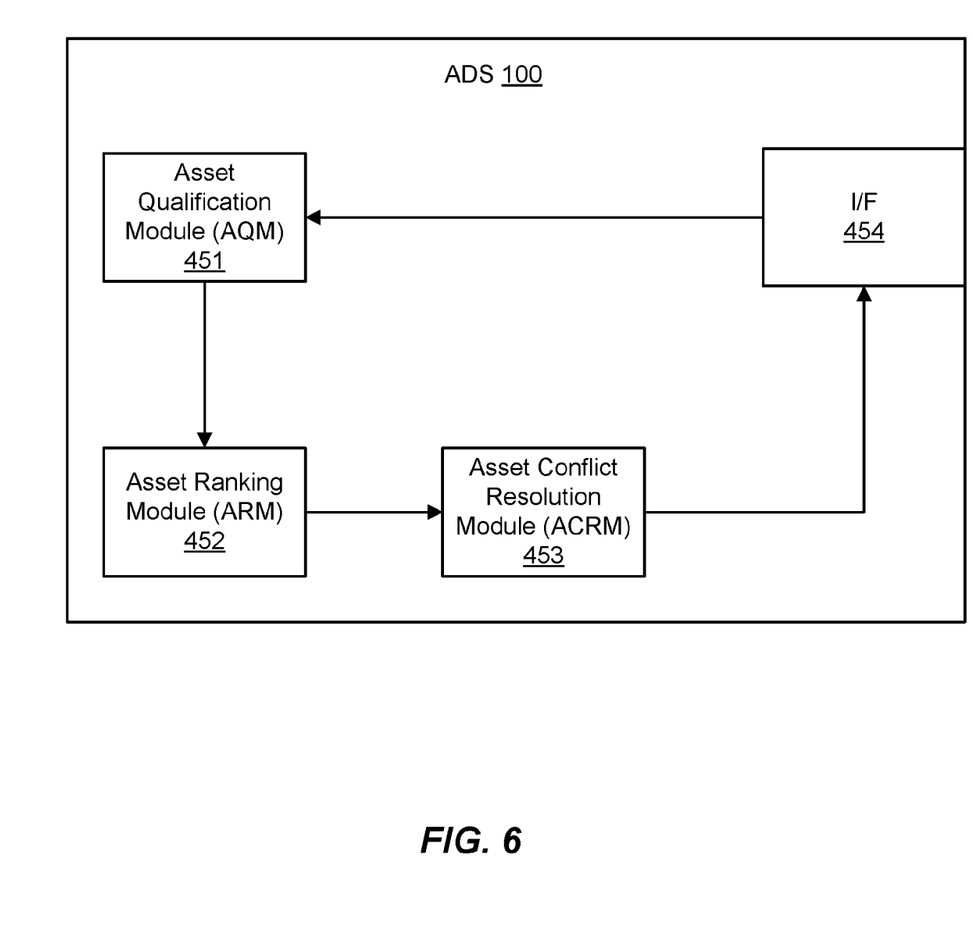
FIG. 6 is a block diagram of an exemplary ADS.

FIG. 6 is a block diagram of an exemplary ADS 100. In this embodiment, the ADS 100 includes an interface 454, an asset qualification module (AQM) 451, an asset ranking module (ARM) 452, and an asset conflict resolution module (ACRM) 453. The interface 454 is any device or system operable to receive information pertaining to a content selection by a UE 108 such that the ADS 100 may direct asset insertion into the selected content. In this regard, the interface 454 may also be operable to transfer information to the COD system 303 to direct the COD system 303 to insert certain assets from the national asset database 376 and/or the local asset database 375.

The AQM 451 is any device or system operable to communicate with the interface 454 to initially qualify assets for insertion within the content. The AQM 451 may exclude certain assets from insertion into the content selected by the UE 108. The ARM 452 is any device or system operable to rank the remaining assets (i.e., those not already excluded by the AQM 451) for insertion to the content 390. The ACRM 453 is any device or system operable to remove any ranked assets from insertion into the content 390 based on conflicts between assets. For example, the ACRM 453 may determine that assets from certain advertisers conflict with one another (e.g., Coke and Pepsi). Accordingly, the ACRM 453 may be operable to prevent assets from these advertisers from being inserted within a same timeslot 391 or even within a same content 390. The exemplary operations of the AQM 451, the ARM 452, and the ACRM 453 are explained in greater detail below.

Overall, the ADS 100 is any system, device, software, or combination thereof operable to process information about assets (e.g., advertisements, marketing materials, etc.) of asset providers (e.g., of the asset database 125) such that the ADS 100 can direct a content provider to insert assets from the asset providers into COD content selected by a UE 108. The ADS 100, being communicatively coupled to the COD system 303, processes information pertaining to the content selection and selects assets for insertion into that content from a national asset database and/or a local asset database, as illustrated in FIG. 4. To provide more context to the operations of the ADS 100, the following example is provided.

To illustrate, a UE 108 selects a particular episode of the television show "30 Rock" at 8 pm on a Thursday night from a menu of COD content that is presented by the COD system 303. The COD system 303 retrieves that episode of 30 Rock from the content database 374. The COD system 303 then retrieves certain assets from the national asset database 376 for insertion into the timeslots of that show. As with many other 30 minute situational comedies, this episode of 30 Rock includes two content sections 390-1 and 390-2 and the three timeslots 391-1, 391-2, and 391-3, as illustrated in FIG. 5. Using this example, the COD system 303 transfers an asset insertion request to the AQM 451 to insert assets into these three timeslots. The AQM 451 then determines that there are a total of six 30 second asset placement opportunities within three timeslots 391-1-3 of the selected content 390. The AQM 451 then processes the active campaigns to determine their eligibility within those six 30 second asset placement opportunities. Among the active campaigns in this example are:

1. A Coca-Cola campaign with a total of four assets and 3 campaign items directing placement opportunities of those assets as follows:
    a) Asset 1 for 100 views anytime;
    b) Asset 2 for any viewing opportunities Monday through Friday between the hours of 5 pm and 10 pm; and
    c) Assets 3 and 4 for any viewing opportunities Friday and Saturday between the hours of 5 pm and 10 pm.

2. A Pepsi-Cola campaign with a total of five assets and four campaign items directing placement opportunities of those assets as follows:
    a) Asset 1 for 20 views anytime;
    b) Asset 2 for 100 views anytime;
    c) Asset 3 for 1000 views anytime;
    d) Asset 4 for any viewing opportunities Monday through Friday between the hours of 5 pm and 10 pm; and
    e) Asset 5 for any viewing opportunities Friday and Saturday between the hours of 5 pm and 10 pm.

3. A Capital One credit card campaign with a total of four assets and three campaign items directing placement opportunities of those assets as follows:

a) Asset 1 for 100 views anytime;
b) Asset 2 for 1000 views anytime; and
c) Assets 3 and 4 for any viewing opportunities Monday through Friday between the hours of 5 pm and 10 pm.

4. A Chrysler Motors campaign with a total of three assets and two campaign items directing placement opportunities of those assets as follows:
a) Asset 1 for 100 views; and
b) Assets 2 and 3 for any viewing opportunities Monday through Friday between the hours of 5 pm and 10 pm.

5. A Nickelodeon campaign with one asset and one campaign item directing placement opportunities of that asset as follows:
a) Asset 1 for 100 views.

Since the television show 30 Rock has a mature theme and since the Nickelodeon campaign is directed towards a younger audience, that campaign item is automatically excluded from the eligible campaign list by the AQM 451. Other remaining campaign items are excluded based on time and date (i.e., campaign items 1*c* and 2*e*).

Thus the remaining campaigns of 1*a*-1*b*, 2*a*-2*d*, 3*a*-*c*, 4*a*-4*b* are transferred to the ARM 452 for ranking. Based on various factors explained in greater detail below, the ARM 452 ranks the campaigns as follows:
1. Campaign Item 2*a*
2. Campaign Item 1*a*
3. Campaign Item 3*c*
4. Campaign Item 2*b*
5. Campaign Item 4*b*
6. Campaign Item 4*a*
7. Campaign Item 1*b*
8. Campaign Item 1*d*
9. Campaign Item 2*c*
10. Campaign Item 1*c*
11. Campaign Item 2*d*
12. Campaign Item 3*a*
13. Campaign Item 3*b*

The ARM 452 transfers this ranked list of campaign items to the ACRM 453 to determine conflicts within the ranked list of campaign items. Typically, the six available asset placement opportunities 392-1-6 within the content 390 would be filled by the first six campaign items based on a rank determined by the ARM 452. However, since some conflicts may exist between campaigns within a particular content and/or timeslot, certain campaigns may be excluded from the placement opportunities 392 such that the ranking is reordered. For example, certain criteria may dictate that a Pepsi Cola asset may not be placed within the same content as a Coca-Cola asset. In this regard, the campaign items 1*a*-1*d* are removed from the ranked list because the Pepsi-Cola asset has the higher initial ranking, leaving the following campaign items:
1. Campaign Item 2*a*
2. Campaign Item 3*c*
3. Campaign Item 2*b*
4. Campaign Item 4*b*
5. Campaign Item 4*a*
6. Campaign Item 2*c*
7. Campaign Item 2*d*
8. Campaign Item 3*a*
9. Campaign Item 3*b*

With this computed, the ACRM 453 may remove the final three campaign items 7, 8, and 9 from the list as the six placement opportunities can be filled with assets. The ACRM 453 then transfers this information regarding asset placement to the COD system 303.

Once all of the campaign items at each campaign have been evaluated and no campaigns remain or once all of the placement opportunities have been filled, the ACRM 453 directs the COD system 303 to retrieve the assets based on the list generated. For example, the list may be included in a report message that is transferred to the COD system 303 to direct the COD system 303 to insert the assets into the content selected by the UE 108. It is possible that all of the assets have been excluded during the processes described herein. Thus, the ACRM 453 may then direct the COD system 303 to not place any assets in the content selected by the CPE 457.

The ACRM 453 may even direct the COD system 303 to place assets from the local database 375 and/or the national database 376 into the selected COD content as desired. The ACRM 453 may also direct the COD system 303 to place assets relating to content, programming, or even services provided by the content provider. For example, if no assets remain, standard programming information, such as time and date, pertaining to the selected COD content may be configured as an asset and placed in the selected COD content. To further illustrate, when an episode of "Modern Family" is selected by a UE 108 and no assets remain for insertion into the available time slots of that episode, the ACRM 453 may direct the COD system 303 to present the user of the UE 108 with the date and time when the next episode of Modern Family can be seen.

Since it is also possible that not all of the assets in the list may be placed as there may be more assets than available opportunities, the ACRM 453 may weight the assets prior to placement in the selected COD content. For example, certain assets may provide greater value to the content provider (e.g., the television network). In this regard, the ACRM 453 may rank the remaining assets in a manner that provides the most monetary compensation to the content provider. Thus, the ACRM 453 may reduce the list of available assets for insertion to the amount of opportunities, or timeslots, in the selected COD content to provide this value to the content provider. In any case, the ACRM 453 directs the COD system 303 to place the assets in the selected COD content based on the ranked list. Once placement has been directed, the ACRM 453 generates a placement report and transfers that report to the headend 301 so that the headend 301 can track marketing views (e.g., for later negotiations between content providers and marketers). For example, when a marketer can know how many views of a particular asset there were in a selected COD content, the marketer can assign a value to that asset that may be used in negotiating price for additional views of the asset in future selected COD content.

Generally, assets promoting products and services are maintained in databases by asset owners. A campaign manager may include the databases that store local and national advertisements for COD content insertion in addition to the various campaign rules that are to be implemented with the COD content insertion. For example, the asset owners develop campaigns which are subsequently managed and maintained by the campaign manager. The asset campaigns comprise rules and asset descriptions (e.g., configured as a data structure) that an asset owner may believe serves the asset owner's best marketing interests. Then, these campaigns are passed to the ADS 100 for the ADS 100 to determine the best manner in which the assets of the asset owners are to be inserted into the COD content provided by the COD provider 104.

The rules of the asset campaigns assist the ADS in determining how to exclude and/or promote certain assets in the COD content. For example, the Coca-Cola Company may have a number of advertisements it wishes to be inserted into COD content. Each of those advertisements may be associated with a campaign that targets various demographics of viewers (e.g., age, sex, ethnicity, location, etc.). Some of those assets may even cross multiple campaigns. And, each asset campaign has rules that may, for example, prevent Pepsi-Cola Company advertisements from being inserted too close in time to Coca-Cola advertisements. The campaign manager 102 manages these asset campaigns and provides them to the ADS 100 such that the ADS 100 can select assets that provide value to the COD provider 104 while complying with the rules of the asset campaigns.

Figure 7:
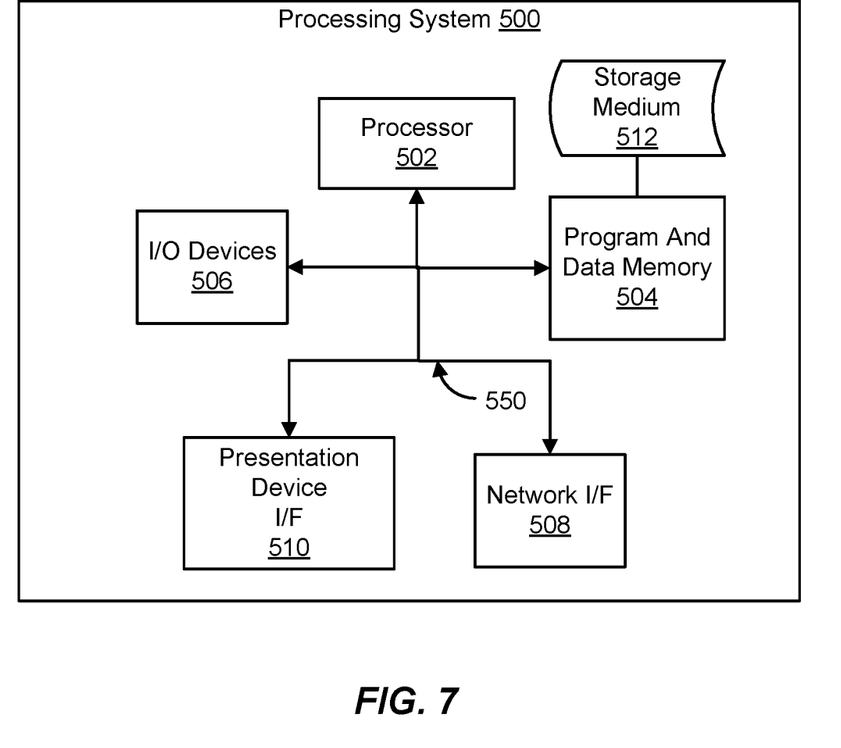
FIG. 7 is a block diagram of an exemplary processing system operable to implement at least portions of the embodiment herein.

FIG. 7 illustrates an exemplary processing system 500 that is operable to implement one or more of the embodiments hereinabove. For example, some of the embodiments of the invention can take the form of a computer program accessible via the computer-readable storage medium 512. The storage medium provides program code for use by a computer or any other instruction execution system. For the purposes of this description, computer readable storage medium 512 can be anything that can contain, store, communicate, or transport the program for use by a computer.

The computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 500, being suitable for storing and/or executing the program code, includes at least one processor 502 coupled to memory elements 504 through a system bus 550. Memory elements 504 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 506 (including but not limited to keyboards, displays, pointing devices, etc.) can be coupled to the processing system 500 either directly or through intervening I/O controllers. Network adapter interfaces 508 may also be coupled to the system to enable the processing system 500 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation devices, such as printing systems and displays for presentation of presentation data generated by the processor 502.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only a preferred embodiment and variants thereof have been shown and described and that all changes and modifications that come within the spirit of the invention are desired to be protected.

Additionally, although the term "headend" generally suggests the distribution center or office of a cable television operator or MSO, the term is not intended to be so limited. The term headend as used herein is any system operable to deliver content to a viewer (e.g., a customer or user of the CPE). For example, the term headend may encompass satellite content providers that offer COD content and/or Internet services to its subscribers. That content is typically delivered directly to the subscriber's antenna for demodulation and decryption by the subscriber's UE 108. Internet traffic in such a system may be conveyed by satellite and/or other delivery mechanisms (e.g., digital subscriber lines, or "DSL", delivered through subscriber phone lines).

A headend may also refer to a telecom provider that distributes content to mobile phones and other devices. Also, the term "asset", as used herein, includes any type of media for which an owner desires promotion. Examples of such include traditional television commercials, advertisements, streaming video commercials, promotional materials, marketing information, and the like. The term "content", as used herein, is any type of media, such as audio, video, and/or webpage data, in which assets may be inserted. For example, the content operable within the COD delivery systems described herein may be streamed Internet audio/video, analog cable television feeds, digital cable television feeds, digital satellite television feeds, or digital satellite radio feeds. Thus, the content of the COD described herein is intended to encompass Video on Demand (VOD) and pay-per-view (PPV) delivered by both modern cable television and satellite television.

What is claimed is:

1. A system operable in a Content On Demand (COD) environment, the system comprising:
   an asset decision system (ADS) operable to interact with a remote COD provider that provides a selected COD content to a user's equipment (UE), to evaluate a plurality of assets for insertion into the selected COD content, and to rank the assets; and
   a request manager operable to determine that the UE is blocking a request for asset insertion into the selected COD content, and to generate a message for the UE requesting payload delivery information for the selected COD content based on the determination,
   wherein the message further includes information that circumvents the blocking and directs the UE to request asset insertion,
   wherein the request manager is further operable to process a response from the UE for the payload delivery information for the selected COD content, to extract a request for asset insertion from the response, to direct the ADS to select a first of the assets based on the ranking, and to direct the remote COD provider to insert the first asset with the selected COD content;
   wherein the payload delivery information requests a type of filtering for the selected COD content;
   the type of filtering is a Cascading Style Sheets (CSS) filtering.

2. The system of claim 1, wherein:
   the type of filtering is a domain filtering.

3. The system of claim 1, wherein:
   the UE is selected from a group consisting essentially of a streaming media player, a smart phone, a tablet computer, and a laptop computer.

4. A method operable in a Content On Demand (COD) environment, the method comprising:
   receiving a request for COD content from a user's equipment (UE) for delivery of the COD content to the UE;

evaluating a plurality of assets for insertion into the COD content;
ranking the assets;
determining that the UE is blocking a request for asset insertion into the COD content;
generating a message for the UE requesting payload delivery information for the COD content based on the determination,
wherein the message further includes information that circumvents the blocking and directs the UE to request asset insertion;
processing a response from the UE for the payload delivery information for the COD content;
extracting a request for asset insertion from the response;
directing the ADS to select a first of the assets based on the ranking; and
directing the remote COD provider to insert the first asset with the COD content;
including, in the payload delivery information, requests for a type of filtering for the COD content;
the type of filtering is a Cascading Style Sheets (CSS) filtering.

5. The method of claim 4, wherein:
the type of filtering is a domain filtering.

6. The method of claim 4, wherein:
the UE is selected from a group consisting essentially of a streaming media player, a smart phone, a tablet computer, and a laptop computer.

7. A non-transitory computer readable medium operable in a Content On Demand (COD) environment, the computer readable medium comprising instructions that, when executed by a processor, direct the processor to:

receive a request for COD content from a user's equipment (UE) for delivery of the COD content to the UE;
evaluate a plurality of assets for insertion into the COD content;
rank the assets;
determine that the UE is blocking a request for asset insertion into the COD content;
generate a message for the UE requesting payload delivery information for the COD content based on the determination,
wherein the message further includes information that circumvents the blocking and directs the UE to request asset insertion;
process a response from the UE for the payload delivery information for the COD content;
extract a request for asset insertion from the response;
direct the ADS to select a first of the assets based on the ranking; and
direct the remote COD provider to insert the first asset with the COD content;
including, in the payload delivery information, requests for a type of filtering for the COD content;
the type of filtering is a Cascading Style Sheets (CSS) filtering.

8. The computer readable medium of claim 7, wherein:
the type of filtering is a domain filtering.

9. The computer readable medium of claim 7, wherein:
the UE is selected from a group consisting essentially of a streaming media player, a smart phone, a tablet computer, and a laptop computer.

\* \* \* \* \*